United States Patent [19]

Slowbe

[11] 4,382,710
[45] May 10, 1983

[54] JOINT ASSEMBLIES BETWEEN STRUCTURAL MEMBERS

[76] Inventor: Joseph A. Slowbe, 3189 W. 73rd St., Cleveland, Ohio 44101

[21] Appl. No.: 198,709

[22] Filed: Oct. 20, 1980

[51] Int. Cl.$^3$ .......................... B25G 3/00; F16B 9/00; F16L 41/00
[52] U.S. Cl. .................................... 403/252; 403/348; 403/254
[58] Field of Search ................. 403/252, 254, 348, 11, 403/171–176, 187, 189, 230, 217, 218, 219; 248/222.1, 222.3; 211/192, 182

[56] References Cited

U.S. PATENT DOCUMENTS

| | | | |
|---|---|---|---|
| 2,966,708 | 1/1961 | Freeman, Jr. | 20/95 |
| 3,025,122 | 3/1962 | Millman | 312/245 |
| 3,080,980 | 3/1963 | Gibbons | 248/222.3 |
| 3,270,479 | 9/1966 | Weinar | 403/252 X |
| 3,532,370 | 10/1970 | Fenwick | 403/252 X |
| 3,749,432 | 7/1973 | Janssen | 403/348 X |
| 3,778,175 | 12/1973 | Zimmer | 287/54 |
| 3,780,485 | 12/1973 | Matson | 52/665 |
| 3,798,865 | 3/1974 | Curtis | 52/665 |
| 3,986,780 | 10/1976 | Nivet | 403/348 X |
| 3,989,399 | 11/1976 | Slowbe | 403/245 |

FOREIGN PATENT DOCUMENTS 7712422  5/1978  Netherlands ...................... 403/254

*Primary Examiner*—Wayne L. Shedd
*Attorney, Agent, or Firm*—Meyer, Tilberry & Body

[57] ABSTRACT

A joint assembly between structural members having plate portions includes an eliptical opening through the plate portion of a first member and a notched locking plate portion on a second member. The latter plate portion is introduced through the eliptical opening parallel to the major dimension thereof and is then rotated 90° to a locking position parallel to the minor dimension of the opening, whereby the notches interengage with the first plate portion to restrain separation of the two structural members. Resilient spring clips are mounted on the first plate portion outwardly adjacent the eliptical opening in the direction of the minor dimension thereof to releaseably engage the second plate portion against rotation when the latter is moved to the locking position. In another embodiment, a composite beam is assembled from a plurality of structural members having plate portions provided with eliptical openings therethrough. The structural members are interengaged with the plate portions in parallel juxtaposed relationship by means of a notched key plate introduced through the openings and rotated relative thereto in the foregoing manner for interengagement with spring fingers on one of the members.

15 Claims, 8 Drawing Figures

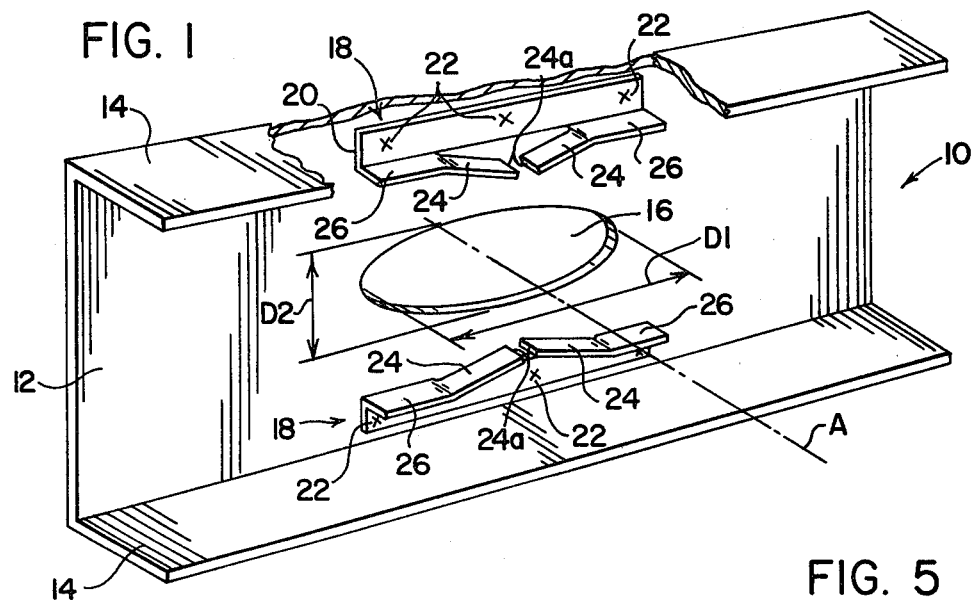
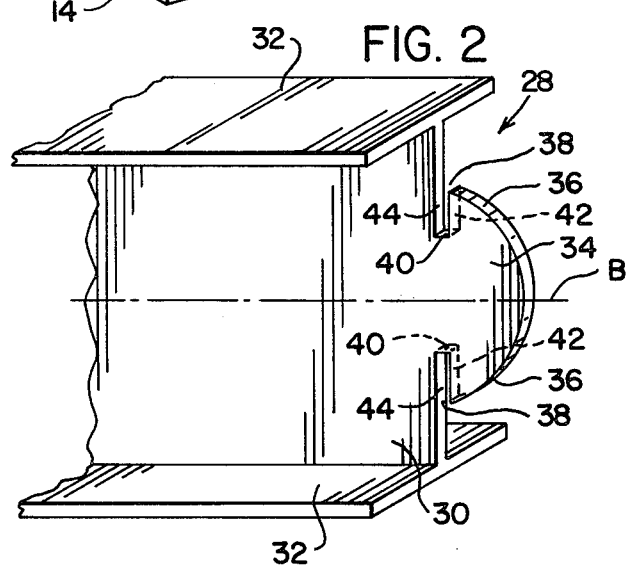
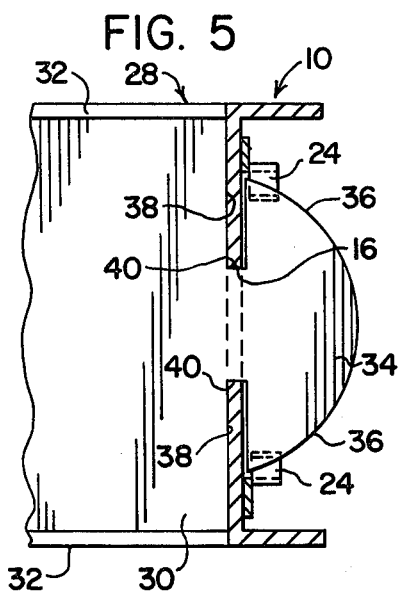
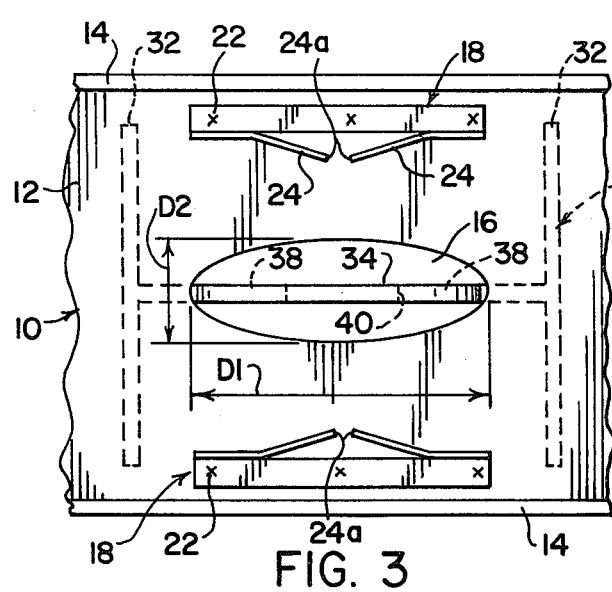
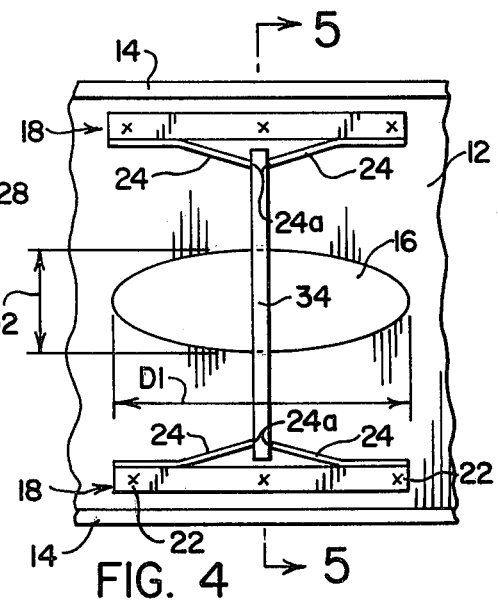

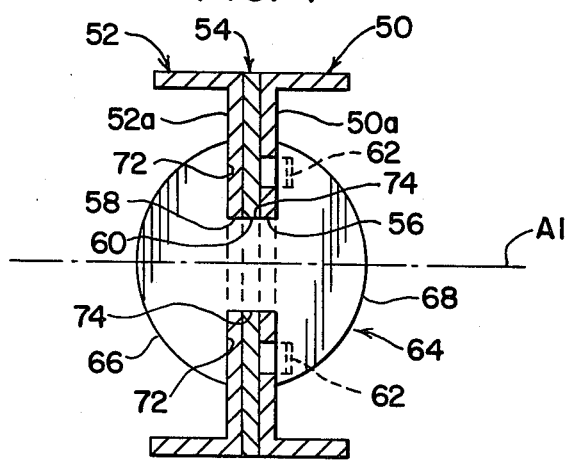
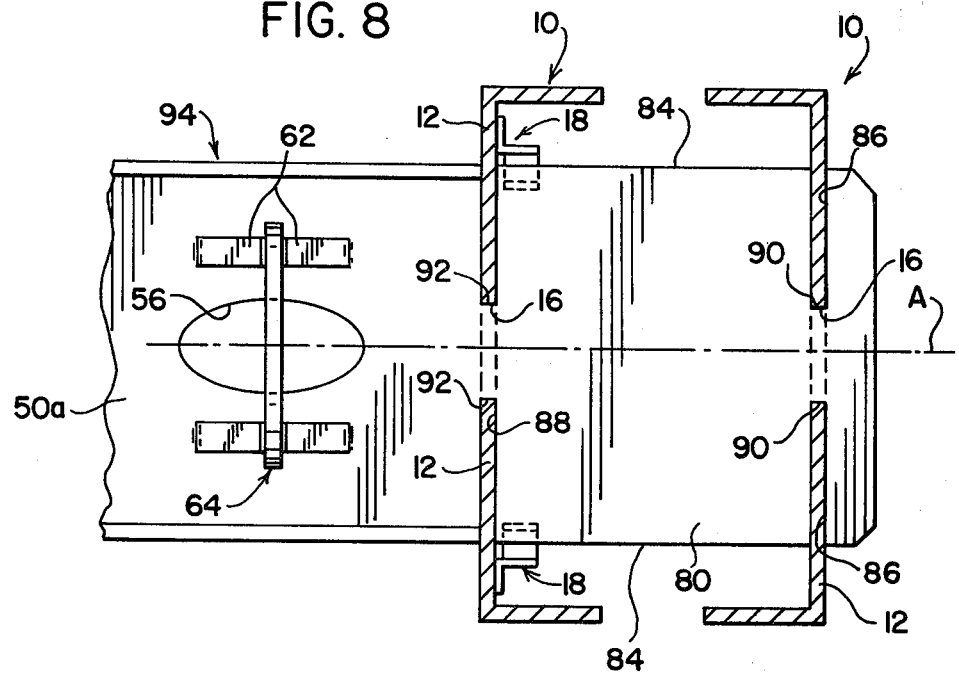

JOINT ASSEMBLIES BETWEEN STRUCTURAL MEMBERS

BACKGROUND OF THE INVENTION

This invention relates to the art of joint structures and, more particularly, to structural joint assemblies between structural components such as joists and beams.

The present invention provides an improvement over the structural joint assemblies disclosed in my U.S. Pat. No. 3,989,399, which joint assemblies provide for snap-locking the end of one structural member to the open side of a channel-shaped second structural member which includes a bottom wall and sidewalls provided with laterally inwardly projecting flanges. More particularly, the end portion of the one structural member is received in the channel and interengages with the channel flanges to restrain separation of the one member in the direction outwardly of the channel, and the channel walls are provided with resilient tabs which interengage with the end portion of the one structural member to restrain longitudinal displacement thereof relative to the channel. While the structural joint assemblies in my earlier patent provide for a pair of structural members to be quickly and easily assembled and relatively positioned and interengaged against separation once assembled, the provision of the channel member with flanges for interengaging with the end portion of the one structural member is extremely expensive and, more importantly, is limiting with respect to use of the joint assemblies by requiring a special flanged channel configuration. Moreover, use is limited by the fact that the end of the one structural member has to be associated with the open side of the channel member. Accordingly, if it was desired to connect a structural member with the opposite side of the channel member it is necessary to provide two channel members back-to-back and interengaged by separate fasteners. Moreover, both of the channels have to be provided with the flanged sidewalls, thus adding to the expense of a given construction and the time required to achieve assembly of the component parts.

SUMMARY OF THE INVENTION

The improved joint assemblies according to the present invention are structurally simpler and are more economical to provide and use, and provide a versatility with regard to the interengagement of construction members heretofore unattainable. More particularly, the joint assemblies according to the present invention are characterized by a non-circular opening through a planar plate portion of one construction member and a locking plate dimensioned to be introduced through the non-circular opening and then rotated relative thereto to a locking position in which recesses in the locking plate interengage with the plate portion of the one construction member to prevent axial separation thereof. Resilient tabs on the apertured construction member interengage with the locking plate upon such rotation thereof to interengage the locking plate in the locking position relative to the one construction member. The locking plate can be a short plate member, or can be provided on the end of a construction member such as a beam. In either event, the non-circular opening and locking plate combination advantageously enables the construction of composite beams or the like, and the provision of joint assemblies interengaging construction members with plate portions thereof in parallel and either juxtaposed or spaced apart relationship with one another, and/or with one construction member perpendicular to a plate portion of another and extending from either of the opposite sides thereof.

More particularly in accordance with the present invention, the non-circular opening in the plate portion of the one member has major and minor dimensions transverse to the axis of the opening, and the locking plate has a width closely corresponding to the major dimension of the opening and has recesses in the opposite side edges thereof having bottoms spaced apart a distance which closely corresponds to the minor dimension of the opening. Accordingly, the locking plate can be introduced through the opening parallel to the direction of the major dimension, and rotation of the locking plate wherein the opening provides for peripheral portions about the opening in the one member to immediately enter the recesses, whereby rotation of the locking plate is guided substantially throughout rotative displacement thereof. Further, providing for the locking plate width to correspond with the major dimension of the opening optimizes the depth dimensions of the recesses for interengagement with the plate portion to optimize stability and structural integrity between the construction components with respect to relative displacement axially of the opening. Preferably, the spacing between the bottoms of the recesses provides for an interference fit between the bottoms and the inner periphery of the opening in the direction of the minor dimension thereof for purposes of stability and structural integrity against relative displacement between the construction components. The resilient tabs by which the locking plate is interengaged in the locking position thereof can be formed integral with the plate portion of the one member adjacent the opening therethrough, or can be separate components suitably attached thereto. In either event, the tabs are positioned adjacent the opening in the direction of the minor dimension thereof so as to be in the path of rotation of the locking plate, whereby the latter displaces the tabs during rotation therepast and is snap-locked in place upon movement to the locking position.

The joint assemblies according to the present invention advantageously enable interengagement of two or more structural members simply by inserting the locking plate portion through the opening and then turning the locking plate portion to a locking position. Furthermore, the joint assembly is achieved without the use of any separate fastening devices, and without the permanent distortion such as by bending of any of the component parts following such interengagement.

It is accordingly an outstanding object of the present invention to provide improved structural joint assemblies between two or more construction components.

A further object is a joint construction providing improved versatility with respect to achieving interengaged relationship between construction components.

Yet a further object is the provision of an improved joint structure comprising a non-circular opening through the plate portion of one construction member and a locking plate adapted to be received in the opening in the direction of the major dimension thereof and having opposed recesses enabling rotation of the locking plate in the opening to a locking position in which the locking plate extends in the direction of the minor dimension of the opening for the recesses to axially interengage with the plate portion of the construction member.

Yet a further object is the provision of a joint structure of the foregoing character which is structurally simple and economical to provide and use, which enables assembly of construction components to be readily effected and which provides considerable structural integrity between the construction components.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIGS. 1 and 2 respectively illustrate first and second structural members of one embodiment of a joint assembly according to the present invention;

FIG. 3 is an elevation view illustrating the initial relative positions of the first and second structural member during assembly thereof;

FIG. 4 is an elevation view showing the first and second members in interengaged relationship providing a joint assembly therebetween;

FIG. 5 is a sectional elevation view of the joint assembly taken along line 5—5 in FIG. 4;

FIG. 7 is a sectional elevation view of one of the joint assemblies between the component parts illustrated in FIG. 6; and, FIG. 8 is a sectional elevation view illustrating yet another embodiment of a joint assembly according to the present invention and including the composite beam of FIGS. 6 and 7.

DESCRIPTION OF THE PREFERRED EMBODIMENTS

Figure 6:
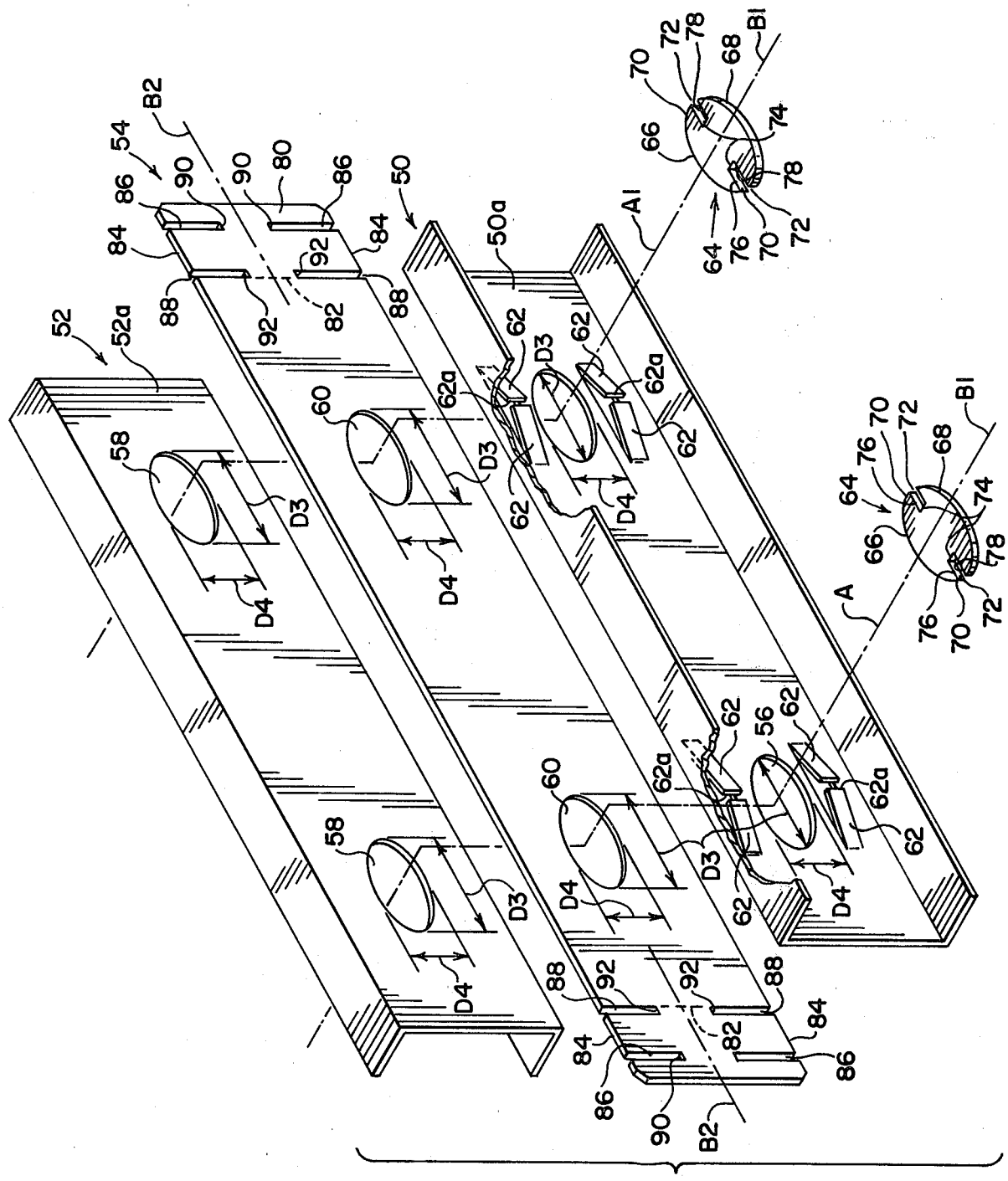
FIG. 6 is an exploded perspective view of the component parts of a composite beam adapted to be constructed with joint assemblies according to the present invention.

With reference now in greater detail to the drawings, wherein the showings are for the purpose of illustrating preferred embodiments of the invention only and not for limiting the invention, FIGS. 1 and 2 respectively illustrate first and second structural members adapted to be interengaged in a manner set forth hereinafter to provide a joint assembly in accordance with the present invention. With reference first to FIG. 1, the first structural member 10 is in the form of a U-shaped channel member having a planar plate portion 12 and walls or flanges 14 extending along the opposite sides of the plate portion and perpendicular thereto. Plate portion 12 is provided with a peripherally closed non-circular opening 16 therethrough which, preferably, is eliptical in peripheral contour. Opening 16 has an axis A and major and minor dimensions D1 and D2, respectively, transverse to axis A. A pair of resilient tab components 18 are mounted on plate portion 12 outwardly adjacent the opposite sides of opening 16 in the direction of minor dimension D2. In the embodiment illustrated, each resilient tab component 18 is produced from resilient material such as spring steel and includes a mounting portion 20 extending in the direction of major dimension D1 and suitably secured to plate portion 12 such as by spot welds 22. Each resilient tab component further includes a corresponding pair of spring fingers 24 extending longitudinally of plate portion 12 and laterally inwardly relative to opening 16 from a corresponding supporting leg portion 26 integral with and extending perpendicular to mounting portion 20. Each spring finger 24 has a corresponding inner end 24a, and the inner ends of each pair of spring fingers 24 are opposed and spaced apart in the direction of major dimension D1 a given distance and for the purpose set forth hereinafter.

The second structural member 28 is illustrated in FIG. 2 as being in the form of an I-beam including a plate portion 30 having an axis B and a pair of flanges 32 extending along opposite edges of the plate portion and perpendicular thereto. Where an I-beam is employed to construct member 28, flanges 32 are cut off so as to provide a locking plate portion 34 extending axially beyond plate portion 30 and having laterally opposite edges 36 spaced apart transverse to axis B a distance no greater than major dimension D1 of opening 16 in first member 10, and a distance which will enable insertion of locking plate portion 34 through opening 16 with edges 36 facing in the direction of the major dimension thereof. Locking plate portion 34 further includes a pair of opposed recesses 38 which are axially aligned with one another and each of which extends inwardly from a corresponding one of the edges 36 and has an inner end 40 spaced inwardly from the corresponding edge. Recesses 38 have corresponding sidewalls 42 and 44 parallel to one another and axially spaced apart a distance corresponding to the thickness of plate portion 12 of first member 10, and inner ends 40 of the recesses are spaced apart from one another a distance which at most is only slightly greater than minor dimension D2 of opening 16 in member 10.

The manner in which members 10 and 28 are joined together, and the joint assembly resulting therefrom, will be best understood with reference to FIGS. 3–5 of the drawing. In this respect, with reference first to FIG. 3, member 28 is first oriented for the plane of locking plate portion 34 to extend in the direction of major dimension D1 of opening 16, and locking plate portion 34 is then introduced axially through opening 16 from the side of plate portion 12 opposite the side on which resilient tab components 18 are mounted. Plate portion 34 is moved through opening 16 until recesses 38 are aligned with plate portion 12 of member 10, and second member 28 is then rotated about axis A from the position illustrated in FIG. 3 to the position illustrated in FIG. 4. In the latter position, the marginal areas of plate portion 12 adjacent the opposite sides of opening 16 in the direction of minor dimension D2 are received in recesses 38, and the marginal portions of locking plate portion 34 adjacent opposite edges 36 and recesses 38 are received between a corresponding pair of spring fingers 24.

At this point, it should be noted that the dimension between opposite edges 36 of locking plate portion 34 preferably is as close to the major dimension D1 of opening 16 as possible, thus to optimize the area of recess walls 42 and 44 engaging the opposite sides of plate portion 12. Furthermore, such a dimension for the distance between side edges 36 advantageously provides for the areas of plate portion 12 adjacent opening 16 at the opposite ends thereof in the direction of major dimension D1 to quickly enter recesses 38 to facilitate guidance of the rotation of locking plate portion 34 during displacement thereof to the position shown in FIG. 4. With regard to such rotation of plate portion 34, it will be appreciated that the rotation can be either clockwise or counterclockwise from the position shown in FIG. 3, and that during such rotation the marginal areas of plate portion 34 adjacent opposite edges 36 engage diametrically opposite ones of the spring fingers 24. Such engagement depresses the spring fingers outwardly with respect to opening 16 and against the inherent bias of the spring metal to enable movement of locking plate portion 34 to a captured position between the corresponding opposed fingers. It will be further appreciated in this respect that the ends 24a of each pair of spring fingers are spaced apart a distance corresponding to the thickness of locking plate portion 34 so that second member 28 is interengaged with first member 10 against relative displacement laterally or rotationally with regard to the axis of opening 16. Preferably, inner ends 40 of recesses 38 are spaced apart a distance which provides for inner ends 40 to frictionally interengage with the corresponding edges of opening 16 in the direction of minor dimension D2 when the locking plate portion is in the position shown in FIG. 4, thus to restrain relative displacement between members 10 and 28 in the direction of minor dimension D2. While locking plate portion 34 is illustrated as being constructed integral with plate portion 30 of member 28, it will be appreciated that the locking plate portion could be a separate component suitably attached to the end of the web or an I-beam such as by spot welds or rivets. It will be further appreciated in connection with such a modification that the end face of the web of the I-beam could provide the axially inner sides of the recesses receiving the plate portion of structural members having the opening therethrough.

FIGS. 6 and 7 of the drawing illustrate the construction of a composite structural beam through the use of structural joint assemblies in accordance with the present invention, and which composite beam includes a locking plate portion at its opposite ends for use in another joint assembly according to the invention. In the embodiment shown in FIGS. 6 and 7, the composite beam is constructed from a pair of channel-shaped structural members 50 and 52 having corresponding plate portions 50a and 52a, respectively, and a planar plate member 54. Members 50, 52 and 54 are joined together as described hereinafter with plate portions 50a and 52a facing one another and with plate member 54 interposed therebetween. More particularly, plate portions 50a and 52a and plate member 54 are provided with corresponding pairs of eliptical openings 56, 58 and 60 therethrough, respectively, providing two sets of openings each having a corresponding common axis A1. Further, openings 56, 58 and 60 are identical in peripheral contour and have identical major and minor dimensions D3 and D4, respectively, transverse to axis A1. Plate portion 50a of member 50 is provided on the side opposite the side facing plate member 54 with opposed pairs of resilient tab components 62 which, in this embodiment, are integral with plate portion 50a and are provided by striking the material of plate portion 50a laterally outwardly adjacent the opposite sides of each opening 56 in the direction of minor dimension D4 of the opening. Each tab 62 has an inner end 62a, and the ends of each pair of tabs are spaced apart in the direction of major dimension D3 a given distance and for the purpose described hereinabove with regard to spring fingers 24. While integral tab components are illustrated, it will be appreciated that tab components such as resilient tab components 18 illustrated and described hereinabove in connection with FIGS. 1–5 can be employed in place of integral tabs.

Members 50, 52 and 54 are adapted to be interengaged to provide a composite beam by means of a pair of identical planar locking plate components 64 each having an axis B1, axially opposite ends 66 and 68, and laterally opposite side edges 70 extending in the direction between the opposite ends. Opposite side edges 70 of each locking plate are spaced apart a distance corresponding to major dimension D3 of openings 56, 58 and 60, and each locking plate member is provided with a pair of opposed recesses 72 which are axially aligned with one another and each of which extends inwardly from the corresponding edge 70 and has an inner end 74 spaced inwardly from the edge. Inner ends 74 are spaced apart from one another a distance corresponding to minor dimension D4 of openings 56, 58 and 60, and each recess includes parallel walls 76 and 78 spaced apart from one another a distance corresponding to the combined thickness of plate portions 50a and 52a and plate member 54. From the foregoing description of the embodiment illustrated in FIGS. 1–5, it will be appreciated that locking plate members 64 are introduced through the corresponding set of openings 56, 58 and 60 with the plane of the locking plate extending in the direction of major dimensions D3 of the openings to bring recesses 72 into alignment with the plate portions. Locking plate members 64 are then rotated about the corresponding opening axis A1 for the plate portions to be received in recesses 72 and for the marginal areas of the locking plates adjacent edges 70 and recesses 72 to be received between resilient tabs 62.

With further regard to FIG. 6 of the drawing, planar plate member 54 has plate portions 80 at its opposite ends each extending longitudinally outwardly from the corresponding ends of members 50 and 52 from an imaginary line 82 which coincides with the corresponding end edges of members 50 and 52 of the composite beam provided by interengaging members 50, 52 and 54 as described hereinabove. Each plate portion 80 provides a locking plate component for a joint assembly according to the present invention and which is structurally and functionally similar to locking plate portion 34 and locking plate components 64 described hereinabove. In this respect, each plate portion 80 has an axis B2 and laterally opposite side edges 84 extending in the direction of the corresponding axis B2 and spaced apart from one another transverse to axis B2. In this instance, and for the purpose which will become apparent hereinafter, each locking plate portion is provided with a first pair of opposed recesses 86 extending laterally inwardly from opposite side edges 84 and a second pair of opposed recesses 88 spaced axially inwardly from recesses 86 and extending laterally inwardly from side edges 84. Each of the recesses 86 has an inner end 90, and each of the recesses 88 has an inner end 92, and each of the recesses 86 and 88 have axially spaced apart sides not designated numerically.

Locking plate portions 80 of the composite beam are adapted to interengage the plate portions of a pair of structural components in parallel spaced apart relationship with respect to one another and perpendicular to the composite beam. The structural components may, for example, be a pair of channel-shaped members such as member 10 illustrated in FIG. 1, and the plate portion 12 of each of which members is provided with an eliptical opening 16 having major and minor dimensions D1 and D2, respectively, and the plate portion 12 of at least one of which members is provided with resilient locking tabs such as the locking tabs 18 illustrated in FIG. 1.

With the latter in mind, together with the foregoing descriptions of the manner in which joint assemblies are constructed in accordance with the present invention, it is believed that the following description of the joint assembly illustrated in FIG. 8 will be readily understood. With reference to the latter Figure, the composite beam is designated generally by the numeral 94 and the component parts thereof which can be seen in FIG. 8 are numbered in accordance with FIGS. 6 and 7 of the drawing. The pair of structural components 10 to be interconnected by locking plate portion 80 at one end of the composite beam are disposed with the plate portions thereof parallel and spaced apart a desired distance, and plate portion 12 of the left hand member 10 is provided with locking tab components 18 as described hereinabove in connection with FIG. 1 of the drawing. From the description of the latter Figure, and as mentioned hereinabove, each of the plate portions 12 has an eliptical opening 16 therethrough providing major and minor dimensions D1 and D2, respectively. Accordingly, it will be appreciated that the opposite side edges 84 of locking plate portion 80 are spaced apart from one another a distance correponding to the major dimensions D1 of openings 16 to provide for plate portion 80 to be inserted through openings 16 with side edges 84 facing in the direction of the major dimension. It will be further appreciated that recesses 86 and 88 in locking plate portion 80 are axially spaced apart a distance corresponding to the desired spacing between plate portions 12, and that the inner ends 90 and 92 of the recesses are spaced apart a distance corresponding to minor dimensions D2 of the openings 16. Accordingly, when locking plate portion 80 has been introduced through openings 16 to bring recesses 86 and 88 into alignment with the corresponding plate portion 12, the composite beam is adapted to be rotated about axis A of openings 16 for plate portions 12 of each member 10 to be received in the corresponding recess, each of which recesses has its axially opposed walls spaced apart a distance corresponding to the thickness of the corresponding plate portion 12. Such rotation of the composite beam displaces the marginal edge portions of locking plate portion 80 adjacent recesses 88 past the resilient tab components and into interengagement between the opposite ends thereof, thus to interengage structural components 10 with one another and with composite beam 94.

It will be appreciated from the foregoing description that a locking plate portion similar to plate portion 80 of a composite beam assembly could be provided as an integral extension of the plate portion of any structural member, such as the web of the I-beam illustrated in FIG. 2, for example, or could be a separate component suitably attached to the plate portion of a structural component such as by welding or riveting. Furthermore, it will be appreciated that the two pairs of recesses in locking plate portion 80 could have different depths relative to opposite side edges 84 for interengagement with members in which the non-circular openings have different minor dimensions with respect to one another. Moreover, it will be appreciated that the opening in the structural component 10 on the right hand side of FIG. 8 could have both major and minor dimensions smaller than the major and minor dimensions of the opening through the left hand member, and that the axially outer end of plate portion 80 could be laterally smaller than the inner end to provide for interengagement thereof with the dimensionally smaller opening.

While considerable emphasis has been placed herein on certain structures of the component parts and the structural interrelationships therebetween in the preferred embodiments, it will be appreciated that modifications of the preferred embodiments as well as other embodiments of the invention can readily be made without departing from the principles of the invention. In this respect, joint assemblies according to the present invention, including those specifically illustrated and described herein are particularly suited for the erection of frame work such as for buildings, partition walls, or the like. Accordingly, it will be appreciated that many structural component configurations including channel-shaped and I-beam members such as those illustrated herein can be provided on one or both of the opposite ends or on other plate portions thereof with locking plate components to enable the provision of a joint assembly according to the invention. Likewise, it will be appreciated that the plate portion of a given structural member can be provided with a plurality of non-circular openings therethrough to enable the joining of a plurality of beams or the like perpendicular to the plane of the plate portion. Furthermore, while it is preferred for the opening or openings receiving the locking plate components to be eliptical in peripheral contour, it will be appreciated that other non-circular openings can be employed which will provide major and minor dimensions cooperable with a locking plate component in the manner described hereinabove. Since these and other modifications will be obvious and suggested to those skilled in the art upon reading and understanding the foregoing description of the preferred embodiments, it is to be distinctly understood that the descriptive matter herein is to be interpreted merely as illustrative of the present invention and not as a limitation.

I claim:

1. A joint assembly between first plate means and second plate means, said first plate means having opposite sides and peripherally closed non-circular opening means therethrough, said opening means having a first axis and major and minor dimensions transverse to said first axis, said second plate means having a second axis and laterally opposite side edges extending in the direction of said second axis and spaced apart a distance greater than said minor dimension and less than said major dimension, whereby said second plate means can be introduced into said opening means with said opposite edges facing in the direction of said major dimension, said second plate means further including recesses extending laterally inwardly from said opposite side edges and having inner ends spaced apart a distance closely corresponding to said minor dimension, whereby said second plate means when in said opening means can be displaced about said first axis to a locking position in which said recesses receive said first plate means, and an opposed pair of resilient tab means on said first plate means and outwardly adjacent each of the opposite sides of said opening means in the direction of said minor dimension, the tabs of each said pair of tabs being spaced apart in the direction of said major dimension to receive a corresponding portion of said second plate means therebetween when said second plate means is displaced about said axis to said locking position.

2. The joint assembly according to claim 1, wherein said opening means is eliptical in peripheral contour.

3. The joint assembly according to claim 1, wherein said second plate means has axially opposite ends and said recesses open from said opposite side edges generally centrally between said opposite ends of said second plate means.

4. The joint assembly according to claim 3, wherein the tabs of each said pair of tabs are spring metal fingers mounted on said first plate means.

5. The joint assembly according to claim 4, wherein said opening means is eliptical in peripheral contour.

6. The joint assembly according to claim 1, wherein said first plate means includes a plurality of planar plate members parallel to one another and said opening means includes coaxial openings through said plate members, said recesses in said locking positions of said second plate means interengaging said plate members against separation perpendicular to the planes thereof.

7. The joint assembly according to claim 6, wherein said plate members facially engage one another.

8. The joint assembly according to claim 7, wherein said openings through said plate members are eliptical in peripheral contour.

9. The joint assembly according to claim 7, wherein said second plate means has axially opposite ends and said recesses open from said opposite side edges generally centrally between said opposite ends of said second plate means.

10. The joint assembly according to claim 9, wherein the tabs of each said pair of tabs are spring metal fingers on one of said plate members.

11. The joint assembly according to claim 10, wherein said openings through said plate members are eliptical in peripheral contour.

12. The joint assembly according to claim 6, wherein said plate members are spaced apart and said recesses in said second plate means includes a pair of recesses for each said plate members, said pairs of recesses being spaced apart along said side edges of said second plate means a distance corresponding to the space between said plate members.

13. The joint assembly according to claim 12, wherein said openings through said plate members are eliptical in peripheral contour.

14. The joint assembly according to claim 12, wherein the tabs of each said pair of tabs are spring metal fingers on one of said plate members.

15. The joint assembly according to claim 14, wherein said openings through said plate members are eliptical in peripheral contour.

* * * * *